United States Patent
Poike et al.

(10) Patent No.: US 8,074,975 B2
(45) Date of Patent: Dec. 13, 2011

(54) MECHANICAL ARRANGEMENT FOR PROCESSING PLATE-LIKE WORKPIECES

(75) Inventors: Thomas Poike, Neukirch (DE); Jens Nemuth, Wilthen (DE)

(73) Assignee: TRUMPF Sachsen GmbH, Neukirch (DE)

( * ) Notice: Subject to any disclaimer, the term of this patent is extended or adjusted under 35 U.S.C. 154(b) by 675 days.

(21) Appl. No.: 12/042,687

(22) Filed: Mar. 5, 2008

(65) Prior Publication Data

US 2008/0217504 A1    Sep. 11, 2008

(30) Foreign Application Priority Data

Mar. 6, 2007  (EP) .................................... 07004569

(51) Int. Cl.
*B23Q 3/18*    (2006.01)
(52) U.S. Cl. .......................................... 269/60; 269/909
(58) Field of Classification Search .................. 269/60, 269/58, 61, 289 R, 909
See application file for complete search history.

(56) References Cited

U.S. PATENT DOCUMENTS

| | | | |
|---|---|---|---|
| 6,254,075 B1 * | 7/2001 | Kozima ........................ | 269/73 |
| 6,588,738 B1 * | 7/2003 | Sukuvaara et al. ........... | 269/293 |
| 6,619,645 B1 * | 9/2003 | Rottler et al. ................. | 269/296 |
| 6,637,737 B1 * | 10/2003 | Beecherl et al. ............. | 269/71 |
| 7,146,705 B2 * | 12/2006 | Ahti et al. ..................... | 29/563 |
| 7,438,286 B2 * | 10/2008 | Umahashi et al. ............ | 269/21 |
| 7,637,487 B2 * | 12/2009 | Muto ............................ | 269/55 |
| 7,669,278 B2 * | 3/2010 | Arikita ......................... | 15/308 |
| 2005/0262683 A1 * | 12/2005 | Ahti et al. ..................... | 29/563 |
| 2008/0217504 A1 * | 9/2008 | Poike et al. .................. | 248/646 |

FOREIGN PATENT DOCUMENTS

| | | |
|---|---|---|
| EP | 0 995 542 | 4/2000 |
| EP | 1 264 788 | 12/2002 |

OTHER PUBLICATIONS

European Search Report from corresponding European Application No. 07004569, mailed Sep. 4, 2007, 6 pages.

* cited by examiner

*Primary Examiner* — Lee D Wilson

(74) *Attorney, Agent, or Firm* — Fish & Richardson P.C.

(57) ABSTRACT

A mechanical arrangement is provided for processing plate-like workpieces, especially metal sheets. The mechanical arrangement includes a processing device and a handling apparatus. A support structure of the handling apparatus has a base support structure and a secondary support structure which is supported on the base support structure so as to be movable relative thereto and which is provided with a holding device for processed products.

14 Claims, 12 Drawing Sheets ically, the position may be optimally adapted to the requirements of the particular application.

MECHANICAL ARRANGEMENT FOR PROCESSING PLATE-LIKE WORKPIECES

CROSS REFERENCE TO RELATED APPLICATIONS

This application claims priority under 35 USC §119(a) from European patent application EP 07 004 569.5, filed Mar. 6, 2007. The complete disclosure of this priority application is incorporated herein by reference.

TECHNICAL FIELD

This invention relates to a mechanical arrangement for processing plate-like workpieces, especially metal sheets.

BACKGROUND

It is known to provide a mechanical arrangement for processing plate-like workpieces, especially metal sheets, having a processing device and a handling apparatus by means of which processed products that have been produced at the processing device by processing of workpieces may be taken away from the processing device. Such a mechanical arrangement may have a support structure with at least one holding device for processed products, wherein the holding device may be attached to at least one processed product to be taken away from the processing device and wherein the holding device is movable in a removal direction with the processed product(s) attached thereto.

An arrangement of that kind is known from EP 0 995 542 A2. That specification discloses a system for laser machining plate-like workpieces. A handling apparatus ("carrier robot") of the prior-known system serves to feed workpieces to be processed to the laser machining devices and to take away the processed products produced at the laser machining devices. For that purpose, the handling apparatus is supported on a support structure which is movable along the laser machining devices and is provided with vacuum pads and with a forked holding device. The workpieces to be processed are fixed to the vacuum pads on their way from a workpiece store to the laser machining devices. The processed products are picked up by means of the forked holding device. In addition, the forked holding device supports the processed products as they are being transported away. In order for the processed products to be picked up by the forked holding device, following their production they are to be transferred first to an unloading position spaced at a relatively great distance from the relevant laser machining device which forms an interference contour for the handling apparatus.

It would be desirable to have a mechanical arrangement that would make it possible to take processed products away more rapidly and thus to enable the entire production process to be speeded up.

SUMMARY

In one aspect, the invention features a mechanical arrangement of the type described above, in which a base support structure is provided which in turn supports a secondary support structure. The secondary support structure is movable relative to the base support structure and has a holding device for processed products, as does the base support structure. In order to pick up processed products that are to be taken away, the holding device of the secondary support structure may be positioned with respect to the processing device.

To implement that positioning motion, use is made of the ability of the secondary support structure to move with respect to the base support structure. The space occupied by the holding device of the secondary support structure makes up merely a proportion of the space occupied by the handling apparatus in its entirety. Consequently, the handling device of the secondary support structure can be moved considerably closer to the processing device than would be possible for the handling apparatus in its entirety owing to the confined spatial conditions in the near vicinity of the processing device. The ability of the secondary support structure provided with the holding device to be moved or positioned with respect to the base support structure makes it possible under those circumstances for processed products to be picked up in the immediate vicinity of the processing device used for their production. Accordingly, following completion of the workpiece processing operation that produces them, processed products to be taken away have to be moved at most over a really short distance before they are accessible to the holding device which is to be attached to them.

The holding device provided on the secondary support structure may be positioned with respect to a further device for the fixing of processed products which is mounted on the base support structure. The base support structure may be used for the attachment of processed products which are to be taken away and also for the attachment of workpieces which are to be processed. In each case, the holding device provided on the secondary support structure may be arranged in such a manner that it may be suitably attached to the processed products to be taken away in the immediate vicinity of the processing device.

In preferred implementations of the invention, the time required to take processed products away is thereby reduced to a minimum. That in turn results in a minimization of the idle times of the processing device. The reason for this is that the sooner processed products are taken away from the processing device, the sooner the processing device is able to resume workpiece processing which is interrupted for the length of time taken for the processed products to be taken away. As a result, the overall production process implemented by means of the arrangement according to the invention is optimized in terms of time. At the same time, the ability of the holding device provided on the secondary support structure to be positioned with respect to the base support structure of handling apparatuses disclosed herein creates the condition required for a wide variety of workpieces to be capable of being taken away from the processing device using the holding devices in one and the same position of the base support structure.

Some implementations may include one or more of the following features.

In a preferred embodiment of the invention, the holding device for processed products which is provided on the secondary support structure may be positioned with respect to the processing device in two axis directions of a positioning plane. That positioning plane runs parallel to a fixing plane which is defined at the holding device of the secondary support structure and which extends parallel to that surface of the processed products to which the holding device of the secondary support structure is to be attached. Owing to the ability of the holding device of the secondary support structure to be positioned along two axes, its position may be optimally adapted to the requirements of the particular application.

For application-related configuration of the secondary support structure with the holding device provided thereon, the positioning of the holding device on the secondary support structure may be ultimately also connected with a positioning of the holding device of the secondary support structure with respect to the processing device.

In some implementations, the holding device for processed products projects from the secondary support structure. Owing to this feature of the invention, the handling apparatus of the arrangement occupies a particularly small space in the immediate vicinity of the processing device. The handling apparatus with the holding device of the secondary support structure may therefore be moved close to the processing device even in extremely confined spaces so that processed products to be taken away may be picked up there.

In another preferred embodiment of the invention, the holding device of the secondary support structure is distributed between a plurality of holding device subunits. This feature of the invention makes it possible, in particular, for a plurality of processed products to be picked up and taken away from the processing device simultaneously. For example, it is possible for holding device subunits to pick up processed products to be taken away at several sides of the processing device simultaneously.

In some cases, the holding device subunits of the of the secondary support structure holding device of the secondary support structure may be positioned on the secondary support structure independently of one another. In these implementations, it is possible to achieve especially flexible adaptation of the holding device of the secondary support structure to changing positions of the processed products to be taken away in the near vicinity of the processing device.

The holding device of the secondary support structure has, in another preferred embodiment of the invention, a plurality of holding elements, preferably vacuum pads. Those holding elements or vacuum pads enable the processed product(s) which are to be taken away to be attached to the handling apparatus in a functionally reliable manner.

Holding elements of the holding device of the secondary support structure may be activated independently of one another. Owing to that measure, the effective range of the holding device of the secondary support structure may be adapted to changing geometries and/or to changing sizes of the processed products to be taken away from the processing device. Using one and the same handling apparatus it is possible for a wide variety of handling tasks to be accomplished. Only those holding elements of the holding device of the secondary support structure that are required for or are usable for fixing of the relevant processed product(s) are activated in each case. The ability of holding elements in the form of vacuum pads to be separately activated is particularly important. In this case, only those vacuum pads that are assigned to a closed region of the processed product to be taken away are activated, that is to say connected to a vacuum. Consequently, the holding force required for secure attachment of the processed product(s) to be taken away can be reliably produced. Impairment of the operability of the vacuum pads, as would be associated, for example, with the application of vacuum pads in a region where there are openings in the processed products, is avoided.

Advantageously, in another preferred embodiment of the invention it is provided that the holding elements of the holding device of the secondary support structure are combined into holding element panels which may be activated independently of one another. That measure simplifies actuation of the holding elements inasmuch as individual actuation or individual activation of holding elements becomes unnecessary.

In some cases, the base support structure also may be used for the attachment of workpieces which are to be processed.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
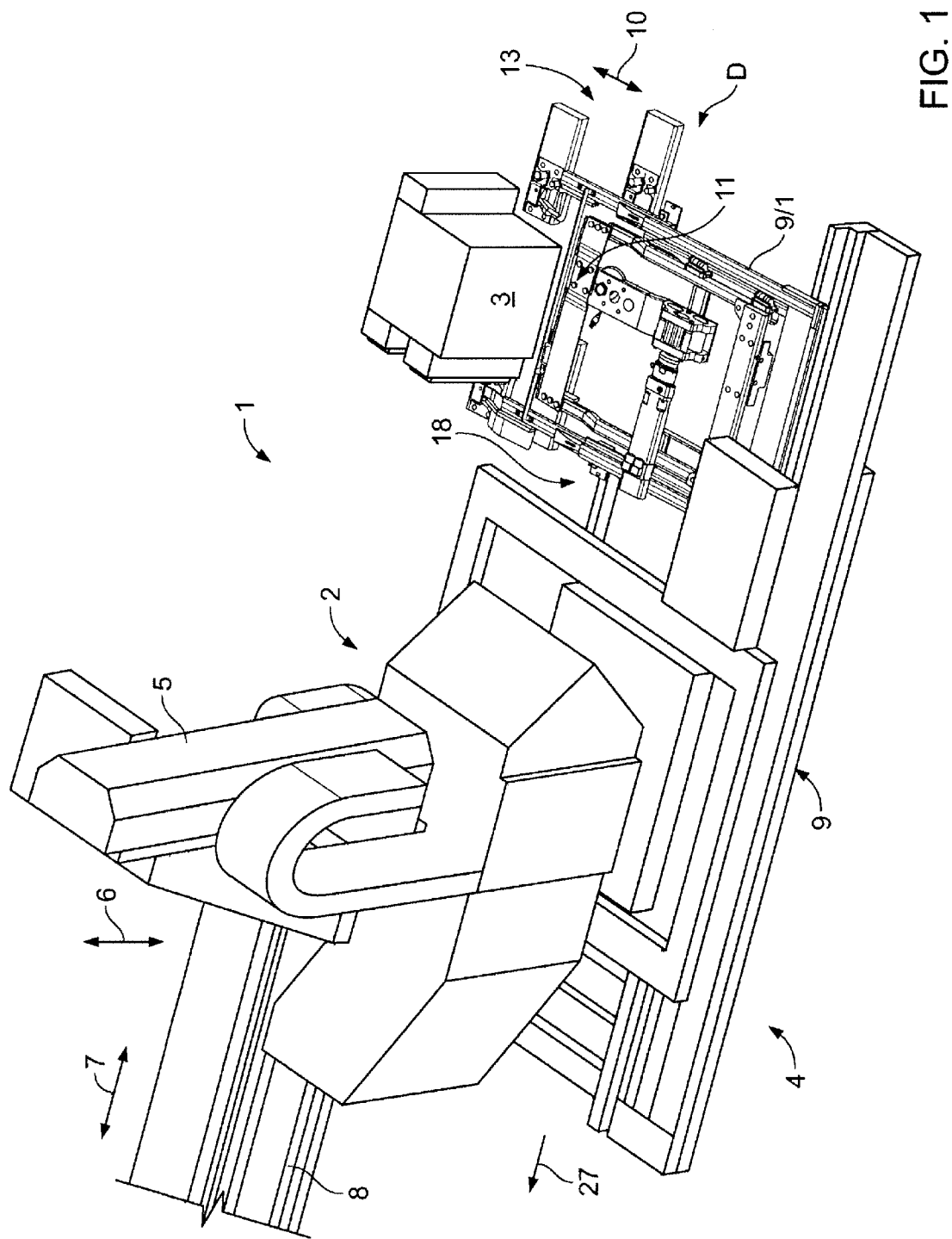
FIG. 1 shows a mechanical arrangement for processing metal sheets, having a punch head and having a handling apparatus with base support structure and secondary support structure.

As shown in FIG. 1, a mechanical arrangement 1 for processing metal sheets includes a handling apparatus 2 and a processing device in the form of a punch head 3. Part of the handling apparatus 2 is formed by a suction pad frame 4 which forms a support structure and which, by means of a movement unit 5, may be raised and lowered in the vertical direction (double-headed arrow 6) and also moved in the horizontal direction (double-headed arrow 7) along a guide track 8.

The suction pad frame 4 is formed by a base support structure 9 and by a secondary support structure 11 which is movably guided in a positioning direction 10 on a guide device 9/1 of the base support structure 9. The base support structure 9 is movable relative to the movement unit 5 of the handling apparatus 2 in the direction of the double-headed arrow 10. Examples of possible advancing positions of the secondary support structure 11 with respect to the base support structure 9 are illustrated on the one hand in FIGS. 2 and 3 and on the other hand in FIG. 4.

The guide device 9/1 forms a projecting support frame 12. Removal strips 14, 15 are mounted on the support frame 12 of the guide device 9/1.

A holding device 13 is provided on the secondary support structure 11 and includes, in the example illustrated, two projecting holding device subunits in the form of removal strips 16, 17. These are bolted to the secondary support structure 11 and may be fixed to the secondary support structure 11 in various positions in the positioning direction 10 and transversely thereto. The removal strips 14, 15 on the support frame 12 of the base support structure 9 may be correspondingly repositioned.

The axes of the possible positioning of the removal strips 14, 15, 16, 17 define a plane that runs parallel to the surface of the processed products to be picked up by means of the removal strips 14, 15, 16, 17.

A numerically controlled displacement drive 18 produces the positioning movement of the secondary support structure 11 with the holding device 13 relative to the guide device 9/1 of the base support structure 9 in the positioning direction 10. An electric drive motor 19 of the displacement drive 18 is mounted on the base support structure 9 and remains stationary during displacement movements of the secondary support structure 11.

Figure 2:
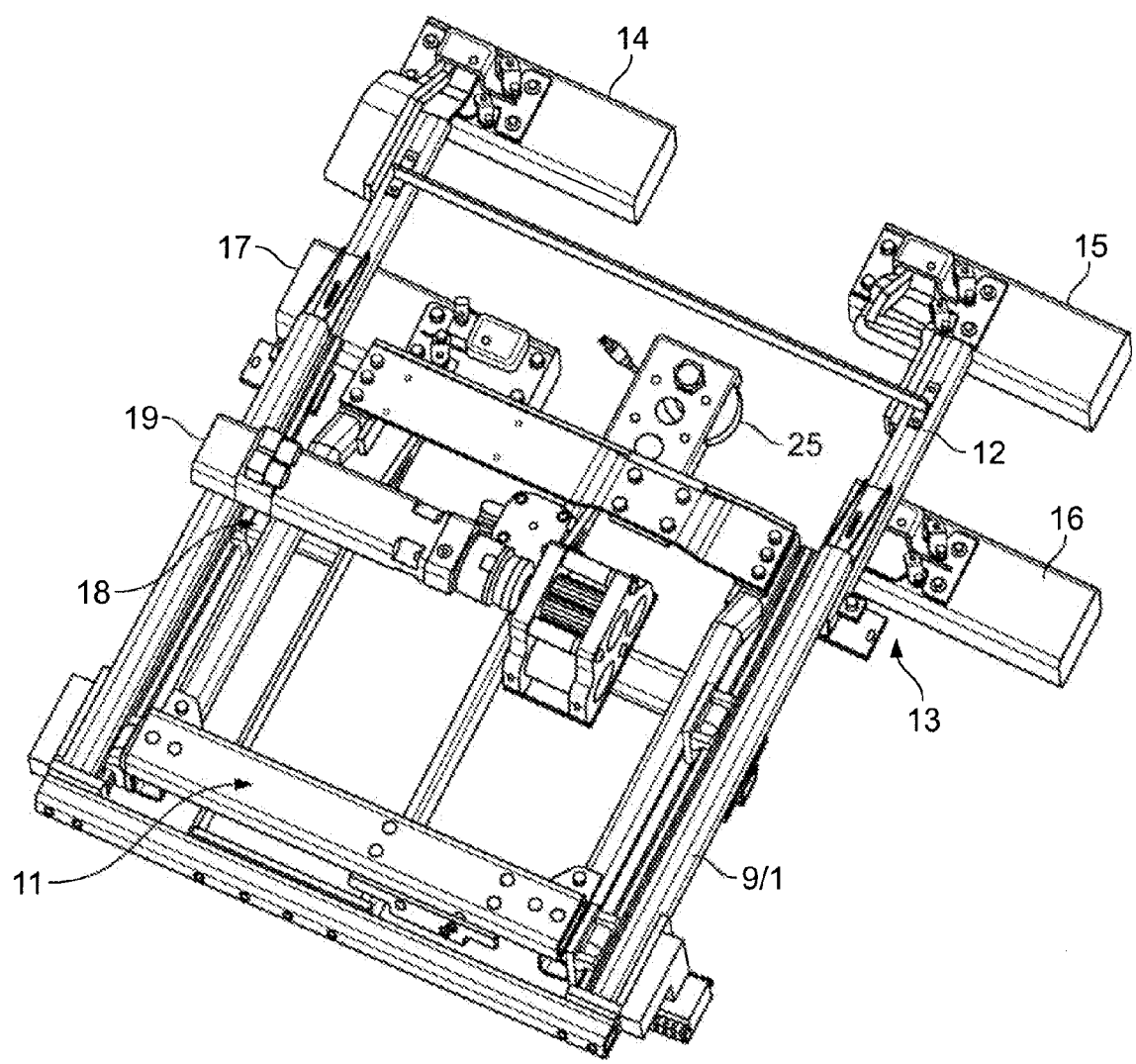
FIG. 2 shows the detail D of FIG. 1 with a portion of the base support structure and with the secondary support structure in a first position of the secondary support structure with respect to the base support structure.
Figure 3:
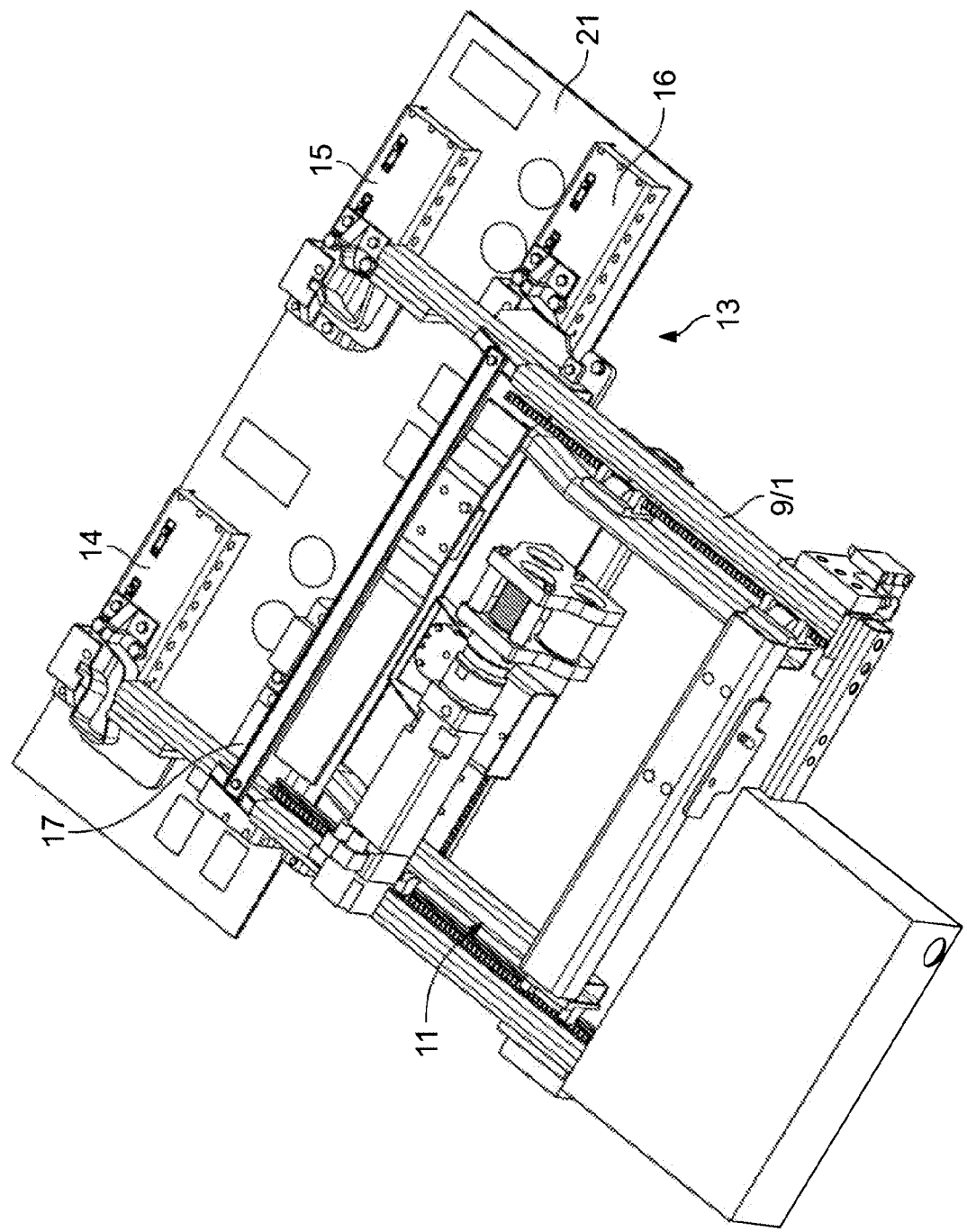
FIG. 3 shows the arrangement shown in FIG. 2, with a metal sheet attached thereto.
Figure 4:
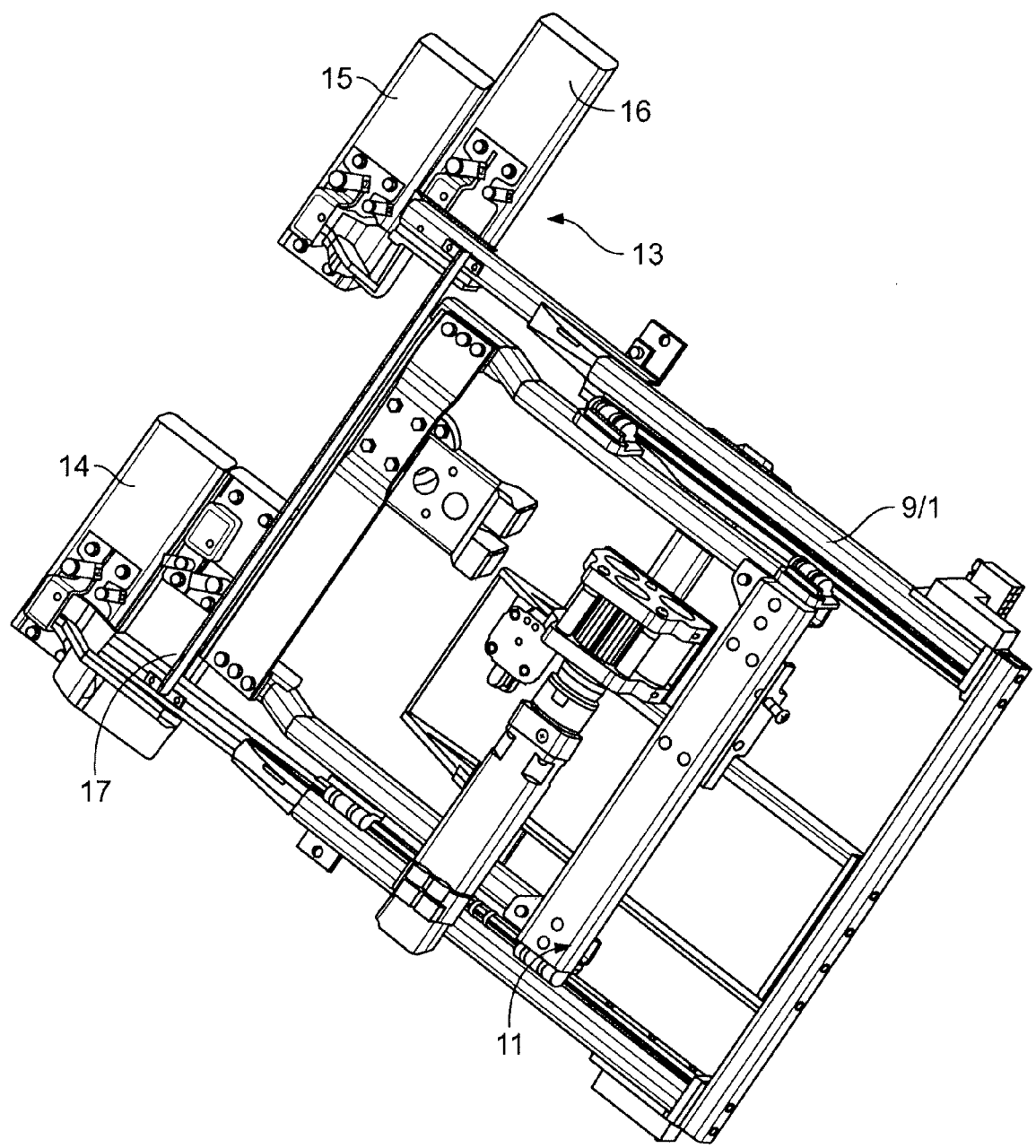
FIG. 4 shows the arrangement shown in FIGS. 2 and 3, in a second position of the secondary support structure with respect to the base support structure.
Figure 10:
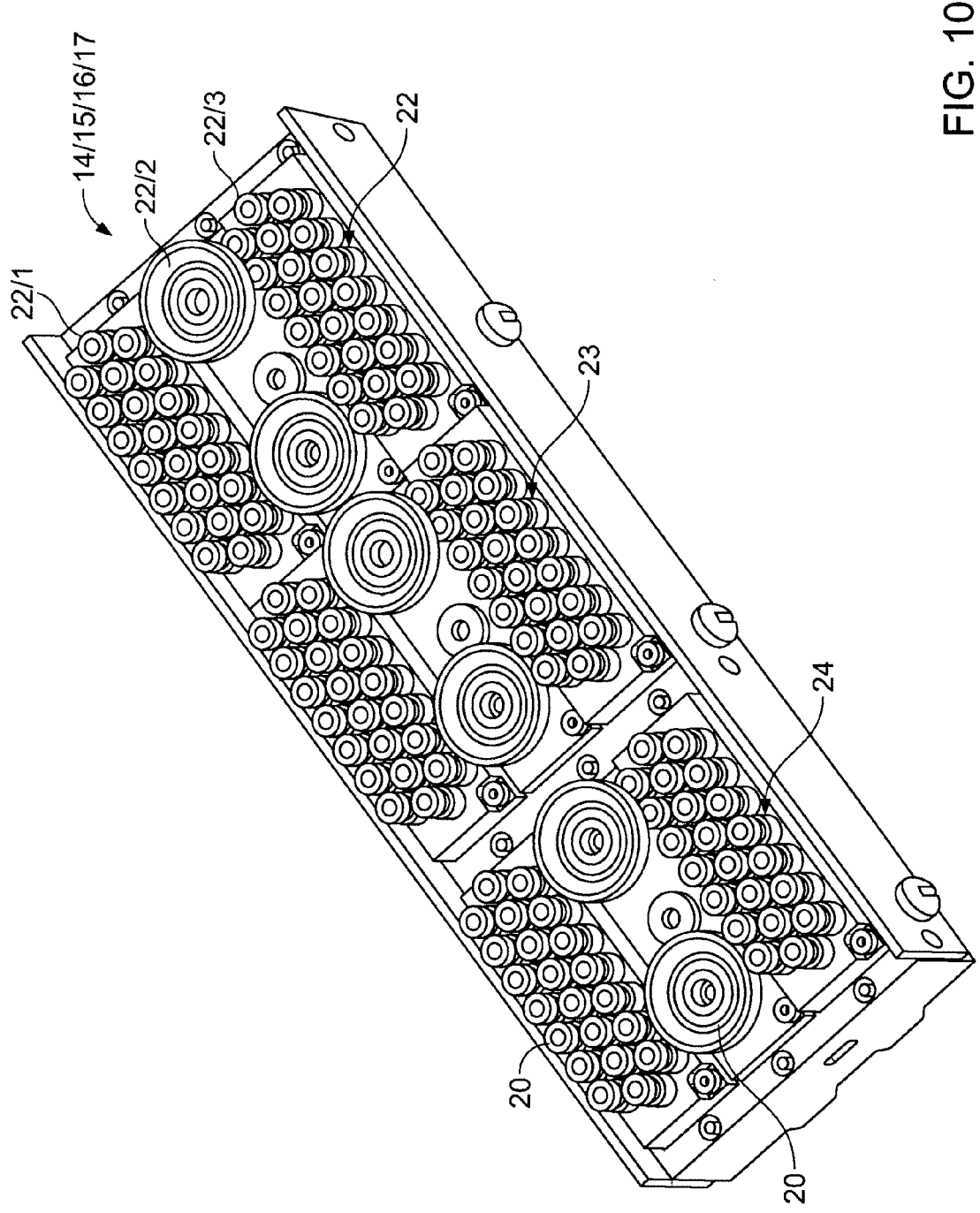
FIGS. 10, 11, 12 show three types of removal strip.
Figure 11:
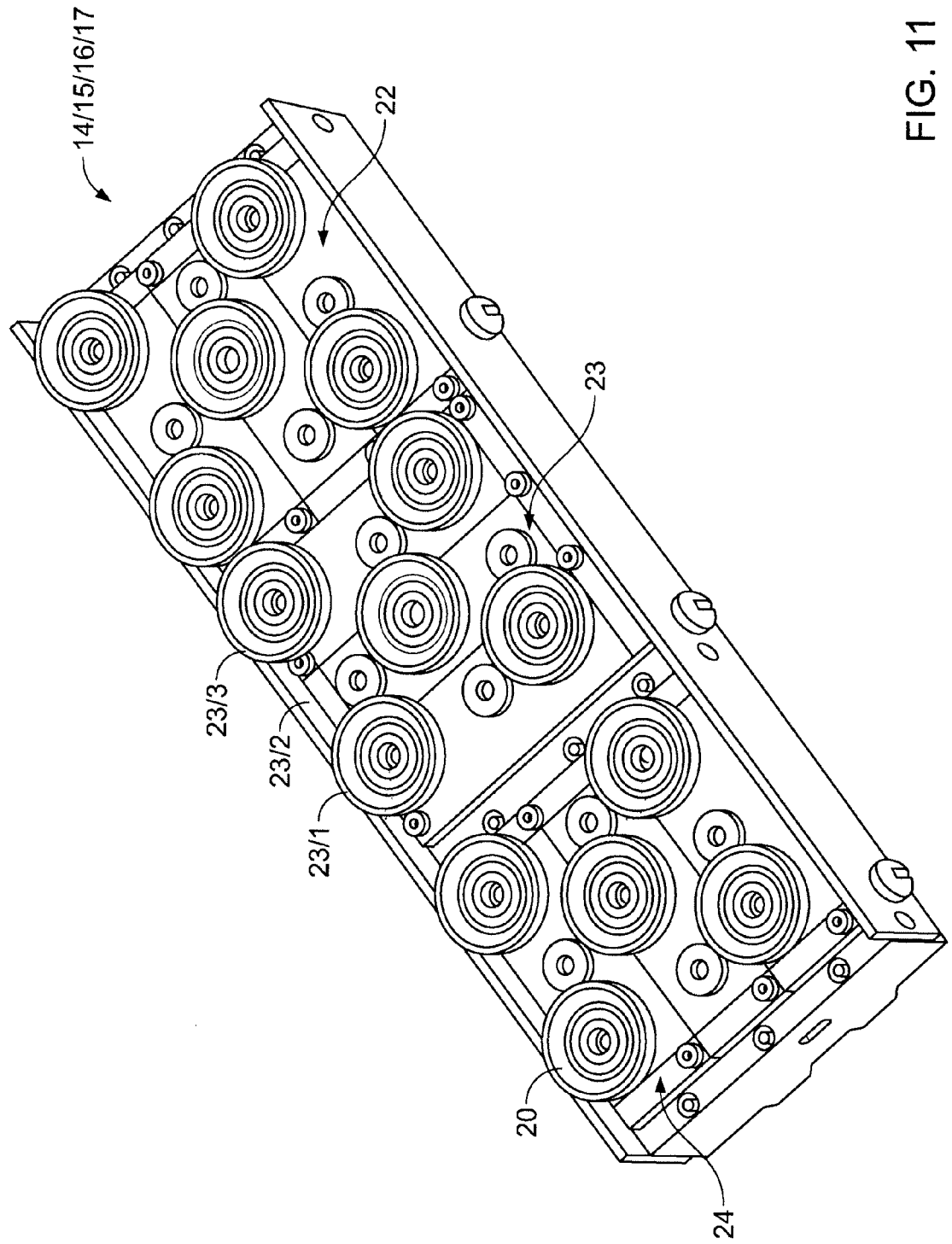
Figure 12:
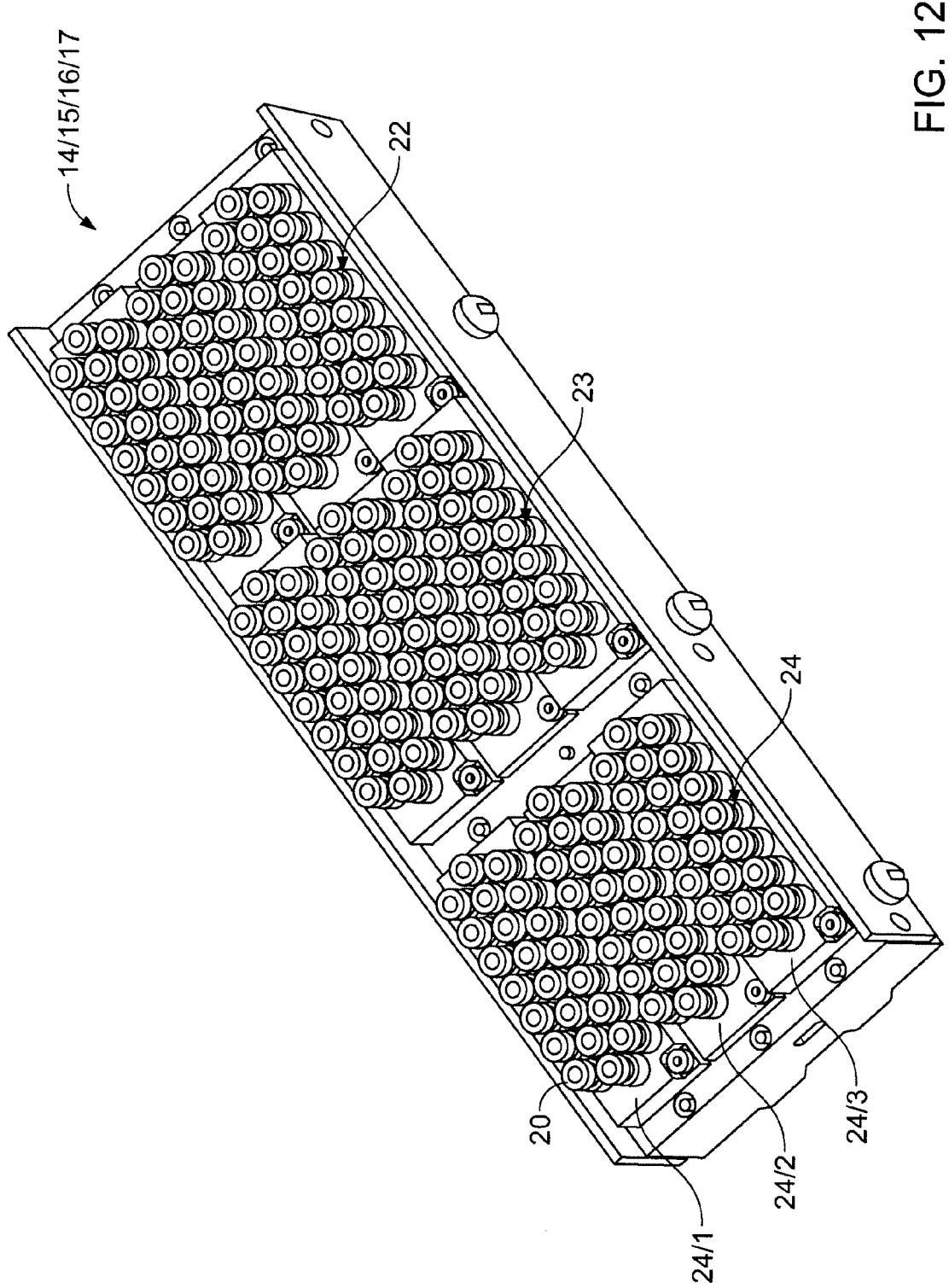

The removal strips 16, 17 of the holding device 13 and similarly the removal strips 14, 15 of the base support structure 9 are provided on their underside with holding elements in the form of vacuum pads 20 (FIGS. 10, 11, 12). The vacuum pads 20 allow metal sheets 21 to be taken up and held by suction—as shown in FIG. 3. In FIGS. 2 and 4, connectors via which the vacuum pads 20 of the removal strips 14, 15, 16, 17 may be connected to a vacuum source are to be seen on the upper side of the removal strips 14, 15, 16, 17.

In FIGS. 1 to 9, for the sake of simplicity the removal strips 14, 15, 16, 17 are shown without the vacuum pads 20. The removal strips 14, 15, 16, 17 are shown in detail, i.e. together with the vacuum pads 20, in FIGS. 10, 11 and 12. The various types of removal strip 14, 15, 16, 17 may be provided on the secondary support structure 11 and on the base support structure 9 individually or in combination.

As shown in FIGS. 10, 11, 12, vacuum pads 20 of various geometries and sizes are possible on the removal strips 14, 15, 16, 17. All of the vacuum pads 20 serve as removal suction pads.

All the illustrated types of removal strips 14, 15, 16, 17 have three main suction pad panels 22, 23, 24. Each of the main suction pad panels 22, 23, 24 includes three holding element panels in the form of suction pad panels 22/1, 22/2, 22/3; 23/1, 23/2, 23/3; 24/1, 24/2, 24/3. The vacuum pads 20 of each suction pad panel 22/1, 22/2, 22/3; 23/1, 23/2, 23/3; 24/1, 24/2, 24/3 may be collectively connected to the associated vacuum source or collectively separated from the vacuum source. The individual suction pad panels 22/1, 22/2, 22/3; 23/1, 23/2, 23/3; 24/1, 24/2, 24/3 may be activated or deactivated independently of one another. The relevant control is assumed by the numerical control of the mechanical arrangement 1.

Further suction pads, in this case supporting suction pads, are provided on the underside of the base support structure 9. For the sake of simplicity, of those supporting suction pads only a single supporting suction pad 25 is shown in the drawings (see FIGS. 2, 5 and 9). The supporting suction pads 25 form together with the removal strips 14, 15 a holding device of the base support structure 9, the supporting suction pads 25 being used primarily for the fixing of workpieces to be processed.

Figure 8:
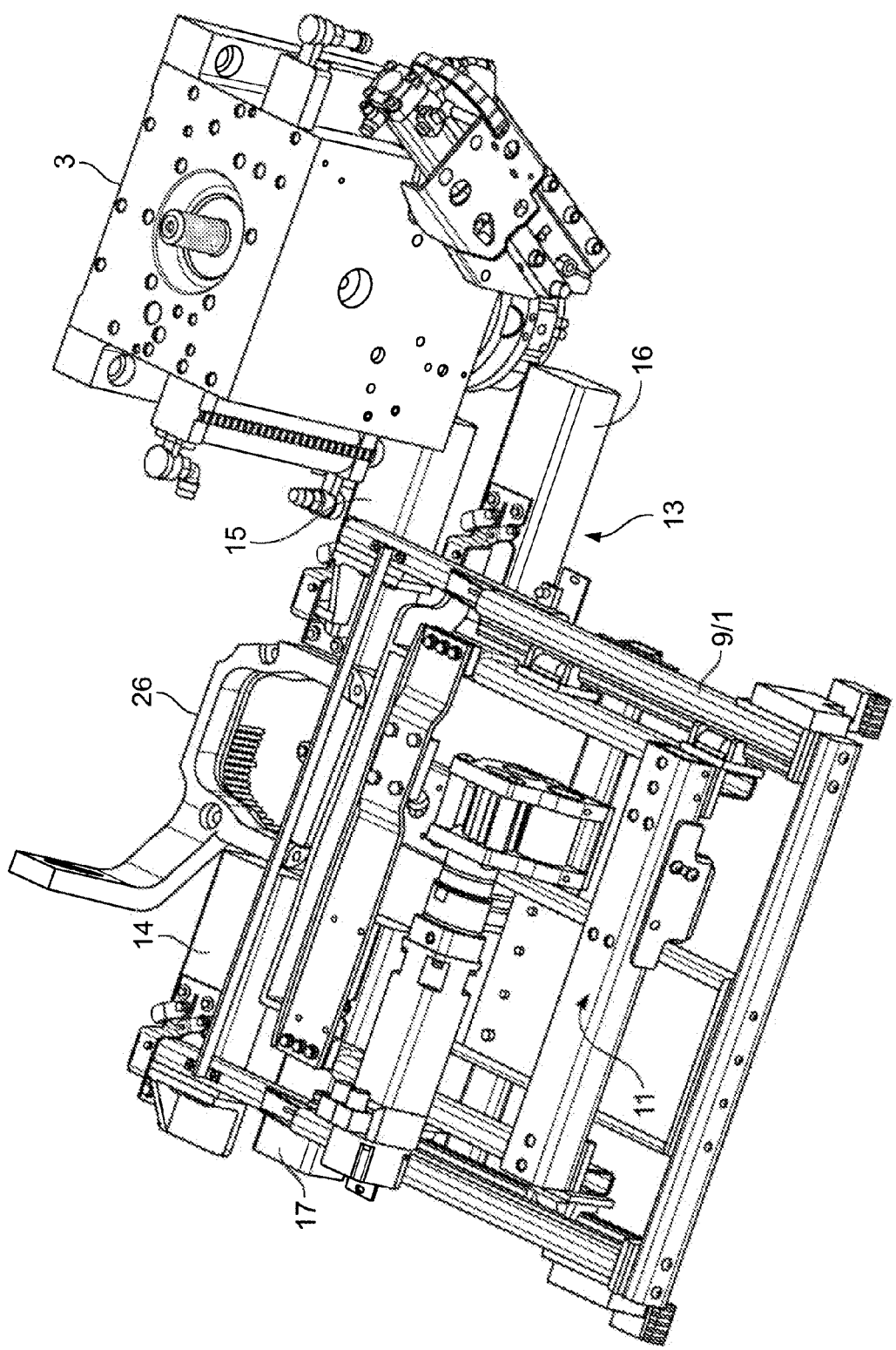
FIG. 8 shows the arrangement shown in FIG. 7, indicating, in addition, a highly schematic laser cutting head.
Figure 9:
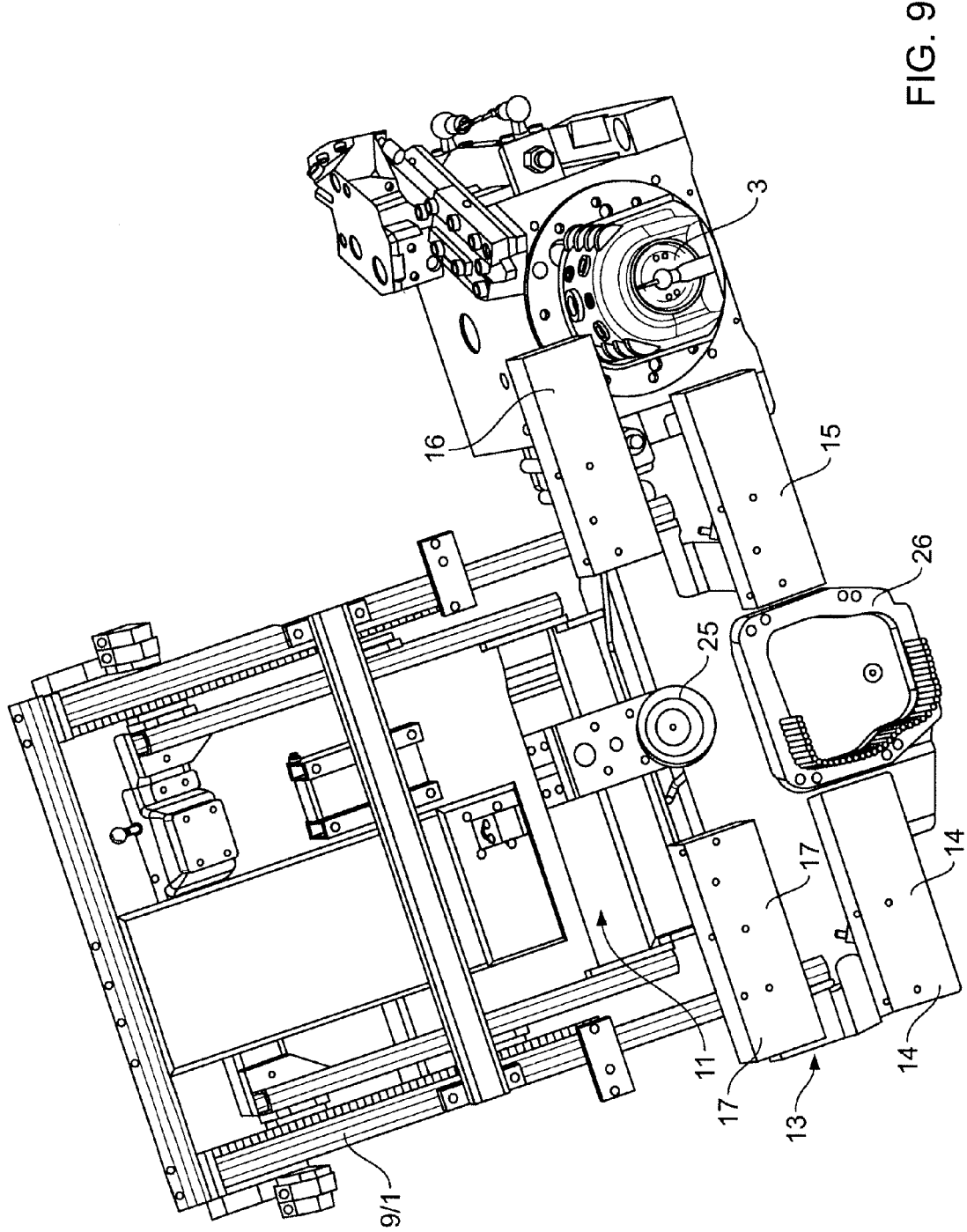
FIG. 9 shows the arrangement shown in FIG. 8 from below.

In addition to having the punch head 3, the mechanical arrangement 1 may have a laser cutting head 26 as a processing device for processing metal sheets, as is shown in a highly schematic form in FIGS. 8 and 9. In this case, combined laser machining/punching of metal sheets is possible.

In operational use, the handling apparatus 2 is first configured to suit the particular handling task to be performed. For that purpose, the removal strips 16, 17 on the secondary support structure 11 and the removal strips 14, 15 on the support frame 12 of the base support structure 9 are positioned appropriately.

Metal sheets to be processed are picked up individually in a store, not shown in the drawings, by means of the handling apparatus 2. The metal sheet in question is attached to the suction pad frame 4 in that operation both by means of the vacuum pads 20 of the removal strips 14, 15, 16, 17 and by means of the supporting suction pads 25 of the base support structure 9. At that point in time, the secondary support structure 11 with the removal strips 16, 17 may adopt that position with respect to the base support structure 9 and its guide device 9/1 in which it is shown in FIG. 2.

After accepting the metal sheet to be processed, the suction pad frame 4 travels along the guide track 8 to the processing device provided for processing of the metal sheet. Near the processing device, the metal sheet to be processed is set down and is subsequently accepted by a coordinate drive, not shown, of the mechanical arrangement 1 and moved to the punch head 3 or to the laser cutting head 26. Processing of the metal sheet then takes place at the punch head 3 or at the laser cutting head 26. Processed products produced in the metal sheet processing operation, for example sheet metal blanks, are taken away from the immediate vicinity of the punch head 3 or the laser cutting head 26 by means of the removal strips 16, 17 of the holding device 13 and by means of the removal strips 14, 15 on the base support structure 9.

For that purpose, with the secondary support structure 11 still arranged on the base support structure 9 as before in the position shown in FIG. 2, the suction pad frame 4 of the handling apparatus 2 is moved along the guide track 8 to a position in which, in the direction of the double-headed arrow 10, the removal strips 14, 15, 16, 17 are opposite the processed product(s) to be picked up.

Starting from that position, the base support structure 9 may be moved, together with the secondary support structure 11 positioned as shown in FIG. 2, towards the punch head 3 or the laser cutting head 26 in order to pick up at that location the processed product(s) which are to be taken away. It is conceivable here for the processed product(s) which are to be taken away to be picked up in that position in which they are arranged immediately following completion of the relevant metal sheet processing operation. Alternatively, it may be that, after completion of the metal sheet processing operation, processed products have to be moved slightly with respect to the punch head 3 or the laser cutting head 26 by means of the coordinate drive of the mechanical arrangement 1 before they are accessible for removal. In each case, the holding device 13 on the secondary support structure 11 and the removal strips 14, 15 on the base support structure 9 are moved to positions in which the vacuum pads 20 to be applied to the processed product(s) to be taken away are situated over the relevant processed product(s). Depending on the geometry and arrangement of the processed products, as a departure from the sequence of operations described above there is the possibility of positioning the secondary support structure 11 with respect to the base support structure 9 in the direction of the double-headed arrow 10 to a position different from the position shown in FIG. 2. For example, a relative position of secondary support structure 11 and base support structure 9 as shown in FIG. 4 is conceivable. The advancing (i.e. the positioning) movement of the secondary support structure 11 relative to the base support structure 9 can take place before the whole structure (comprising both the base support structure and the secondary support structure) is advanced into a position where it is located above the processed products which are arranged near the processing device and which are to be picked up there.

Alternatively, there is the possibility of executing the positioning movement of the secondary support structure 11 with respect to the base support structure 9 at the same time as the movement of the base support structure 9 or of causing it to follow the movement of the base support structure 9. In each case, the positioning movement of the secondary support structure 11 may be numerically controlled.

With the base support structure 9 and the secondary support structure 11, the entire suction pad frame 4 is lowered until vacuum pads 20 of the removal strips 16, 17 and vacuum pads 20 of the removal strips 14, 15 come into contact with the processed product(s) to be taken away. The vacuum pads 20 of the suction pad panel(s) 22, 23, 24 to be used are then connected to the vacuum source and the processed product(s) are taken up by suction by the holding device 13. With the processed product(s) held against the removal strips 14, 15, 16, 17, the suction pad frame 4 travels back from the punch head 3 and/or the laser cutting head 26 before being finally moved with its load in a removal direction 27 along the guide track 8.

Owing to the ability of the secondary support structure 11 to be positioned with respect to the base support structure 9, the handling apparatus 2 can be matched in a flexible manner to the requirements of various applications. An additional possibility for application-related configuration of the handling apparatus 2 is offered by the positionability of the removal strips 14, 15 on the base support structure 9 and the positionability of the removal strips 16, 17 on the secondary support structure 11. Although such a positionability has been implemented in the handling apparatus 2 that has been illustrated and described by way of example, it is nevertheless not compulsory.

Figure 5:
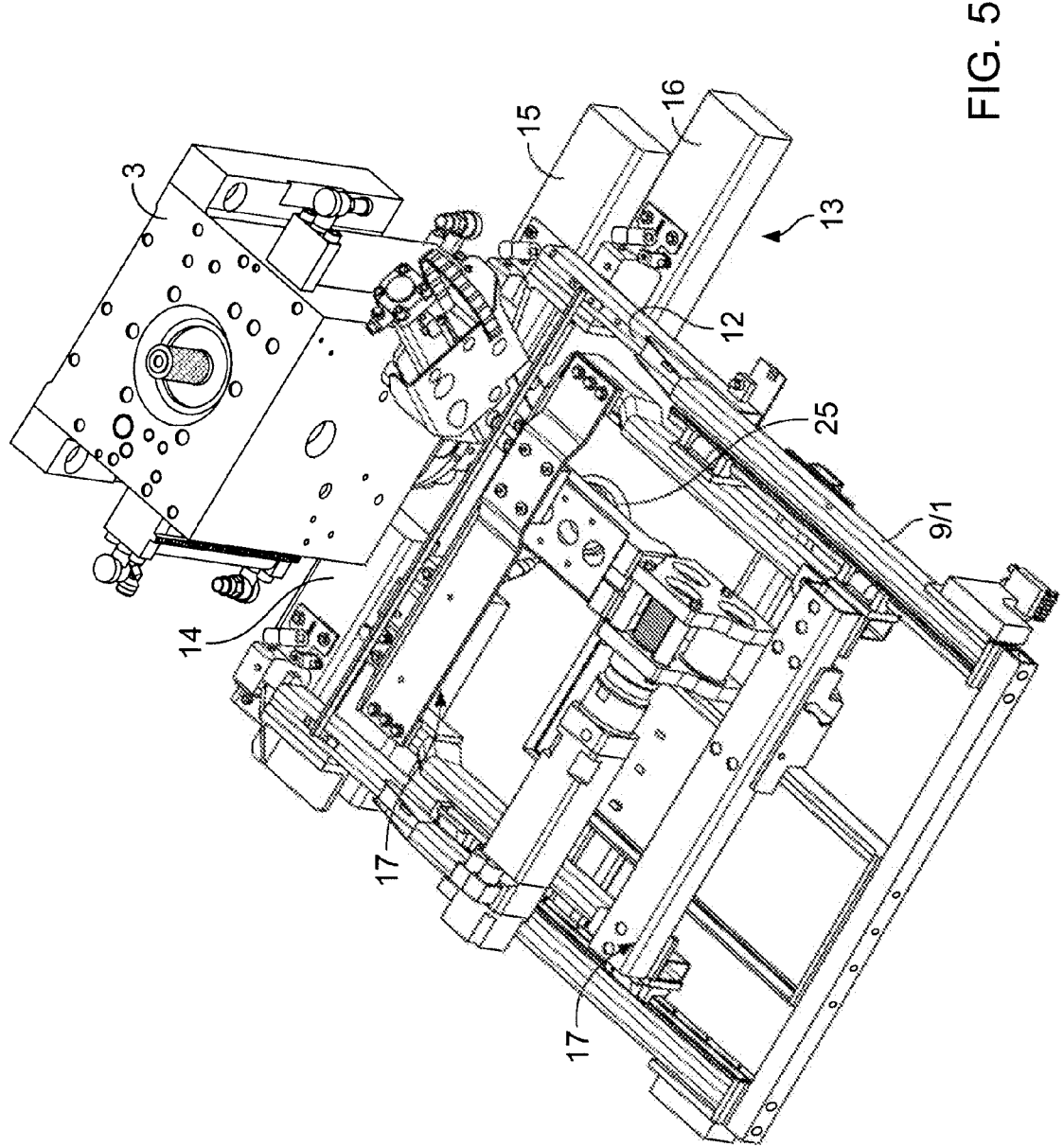
FIG. 5 shows the arrangement shown in FIG. 4 at the punch head shown in FIG. 1 with removal strips on both sides of the punch head.
Figure 6:
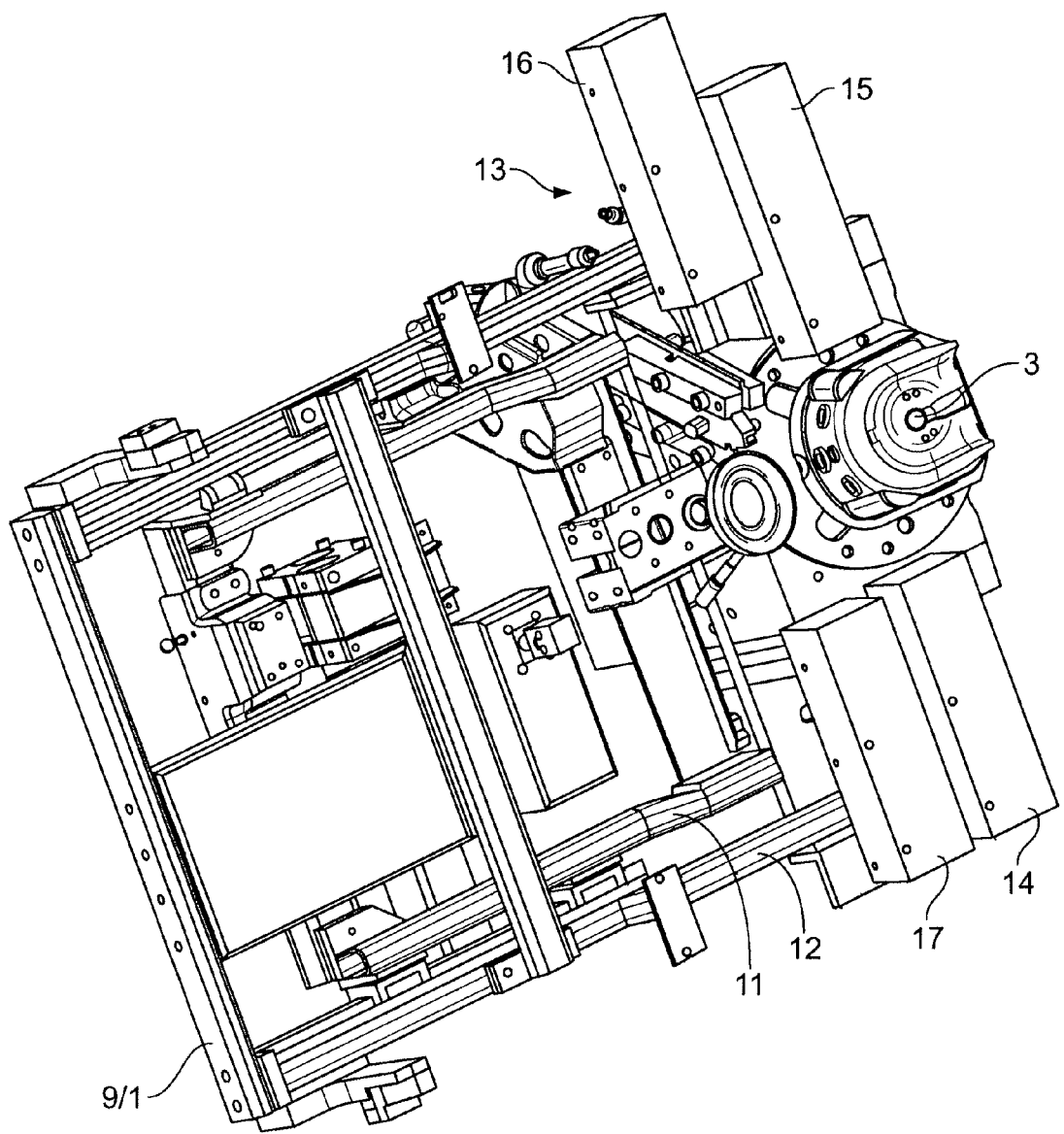
FIG. 6 shows the arrangement shown in FIG. 5 from below.
Figure 7:
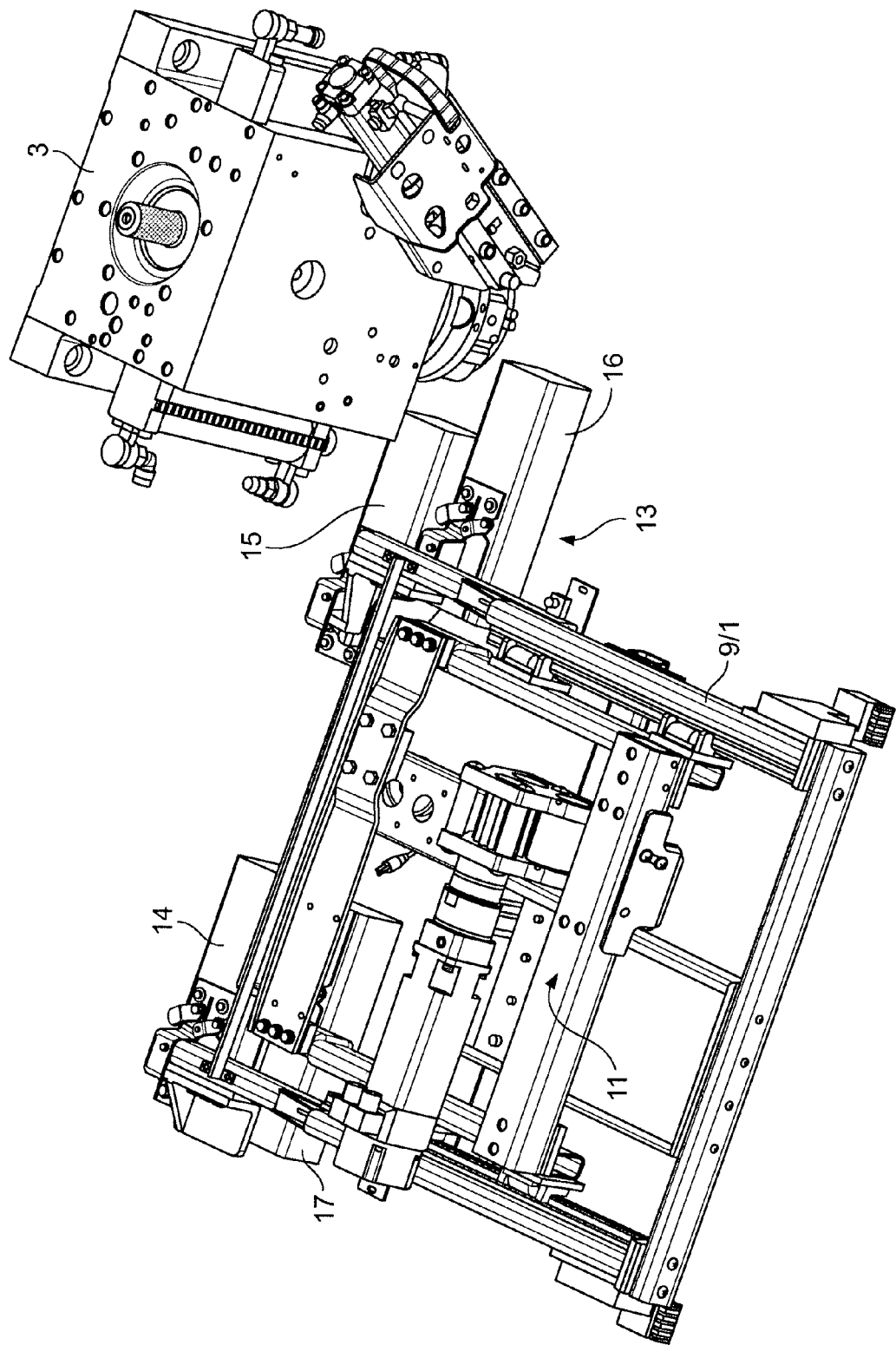
FIG. 7 shows the arrangement shown in FIG. 4 at the punch head shown in FIG. 1 and with removal strips on one side of the punch head.

As shown, for example, in FIGS. 5 and 6, processed products may be taken up simultaneously on both sides of the punch head 3. As shown in FIG. 7, the holding device 13 and the removal strip 15 serve to take away one or more processed products at one side of the punch head 3. In the case of the application illustrated in FIGS. 8 and 9, processed products are taken up between the laser cutting head 26 and the punch head 3 and, in addition, on the side of the laser cutting head 26 remote from the punch head 3.

A number of embodiments of the invention have been described. Nevertheless, it will be understood that various modifications may be made without departing from the spirit and scope of the invention. Accordingly, other embodiments are within the scope of the following claims.

What is claimed is:

1. A mechanical arrangement for processing plate-like workpieces, comprising:
a processing device for processing workpieces; and
a handling apparatus configured to remove processed products that have been produced at the processing device from the processing device, the handling apparatus comprising
a support structure, having a base support structure with a first holding device for processed products, and a secondary support structure with a second holding device for processed products,
wherein the secondary support structure is supported on the base support structure so that the secondary support structure is movable relative to the base support structure,
wherein the second holding device for processed products provided on the secondary support structure comprises a plurality of holding device subunits that are provided on the secondary support structure,
wherein the holding device subunits provided on the secondary support structure are configured to be attached to at least one processed product to be taken away from the processing device, are positionable with respect to the processing device by movement of the secondary support structure relative to the base support structure and, are configured to be selectively arranged on the secondary support structure in different positions parallel to a fixing plane for processed products defined at the holding device subunits, and
wherein both of the first and second holding devices are movable in a removal direction with the processed product(s) attached thereto.

2. A mechanical arrangement according to claim 1, characterized in that the holding device subunits provided on the secondary support structure may be positioned with respect to the processing device in two axis directions of a positioning plane which extends parallel to the fixing plane for processed products defined at the holding device subunits of the holding device of the secondary support structure.

3. A mechanical arrangement according to claim 1, characterized in that the holding device subunits provided on the secondary support structure are positionable on the secondary support structure in a projecting configuration with respect thereto.

4. A mechanical arrangement according to claim 1, characterized in that the holding device subunits of the holding device of the secondary support structure are configured to be selectively arranged on the secondary support structure in different positions independently of one another.

5. A mechanical arrangement according to claim 1, characterized in that the holding device subunits provided on the secondary support structure have a plurality of holding elements, which may be applied to at least one processed product to be taken away from the processing device, for the purpose of attachment thereof.

6. A mechanical arrangement according to claim 1, characterized in that holding elements of the holding device subunits provided on the secondary support structure are configured to be activated independently of one another for attachment of the processed product(s) to be taken away from the processing device.

7. A mechanical arrangement according to claim 5, characterized in that the holding elements of the holding device subunits are combined into holding element panels.

8. A mechanical arrangement according to claim 1, characterized in that the holding device provided on the base support structure is configured to hold workpieces which are to be processed.

9. A mechanical arrangement according to claim 5 wherein at least some of the holding elements comprise vacuum pads.

10. A mechanical arrangement according to claim 7 wherein the holding element panels with the respective holding elements may be activated independently of one another for attachment of the processed product(s) to be taken away from the processing device.

11. A mechanical arrangement according to claim 1 wherein the processing device is configured to process metal sheet workpieces.

12. A mechanical arrangement according to claim 1 wherein the processing device includes a punching device.

13. A mechanical arrangement according to claim 1 wherein the processing device comprises a laser cutting head.

14. A mechanical arrangement according to claim 1, characterized in that the holding device provided on the base support structure includes a plurality of supporting suction pads.

* * * * *